United States Patent
Li et al.

(10) Patent No.: US 11,894,159 B2
(45) Date of Patent: Feb. 6, 2024

(54) PROPORTION ADJUSTABLE SINGLE-PHOTON BEAM SPLITTER BASED ON COLD ATOM STORAGE

(71) Applicant: HEFEI NORMAL UNIVERSITY, Hefei (CN)

(72) Inventors: Dachuang Li, Hefei (CN); Mingxin Dong, Hefei (CN); Kai Wang, Hefei (CN); Wei Song, Hefei (CN); Dongsheng Ding, Hefei (CN); Baosen Shi, Hefei (CN)

(73) Assignee: HEFEI NORMAL UNIVERSITY, Hefei (CN)

( * ) Notice: Subject to any disclaimer, the term of this patent is extended or adjusted under 35 U.S.C. 154(b) by 860 days.

(21) Appl. No.: 16/966,014

(22) PCT Filed: Jun. 30, 2020

(86) PCT No.: PCT/CN2020/099079
§ 371 (c)(1),
(2) Date: Jul. 30, 2020

(87) PCT Pub. No.: WO2022/000221
PCT Pub. Date: Jan. 6, 2022

(65) Prior Publication Data
US 2023/0154638 A1     May 18, 2023

(30) Foreign Application Priority Data
Jun. 28, 2020 (CN) .......................... 202010597307.X

(51) Int. Cl.
*G02F 1/11* (2006.01)
*G21K 1/00* (2006.01)

(52) U.S. Cl.
CPC ................ *G21K 1/006* (2013.01); *G02F 1/11* (2013.01)

(58) Field of Classification Search
CPC ... G21K 1/006; G02F 1/11; G02F 1/09; G02F 1/0126; Y02E 30/10; G06N 10/00
USPC ....................................... 250/505.1
See application file for complete search history.

(56) References Cited

U.S. PATENT DOCUMENTS

2019/0376846 A1* 12/2019 Ma ............................ G01J 3/42
2022/0196716 A1*  6/2022 Anderson .............. G01R 29/10

FOREIGN PATENT DOCUMENTS

CN            111049592 A   *  4/2020
WO    WO-2011073656 A1  *  6/2011  ............ B82Y 10/00

* cited by examiner

*Primary Examiner* — Michael Maskell
(74) *Attorney, Agent, or Firm* — Bayramoglu Law Offices LLC

(57) ABSTRACT

A proportion adjustable single-photon beam splitter based on cold atom storage includes a two-dimensional magneto-optical trap for receiving a first optical signal to be split; and a coupling beam. The coupling beam is incident at a certain angle with the first optical signal to the two-dimensional magneto-optical trap. The storage time of the two-dimensional magneto-optical trap 1 can be adjusted by controlling the switching time of the coupling beam, and then adjusting a proportion of a photon number of a storage part and a photon number of a leakage part of the first optical signal. A splitting proportion may also be adjusted by controlling an optical depth of the alkali metal atomic group trapped in the two-dimensional magneto-optical trap.

13 Claims, 1 Drawing Sheet

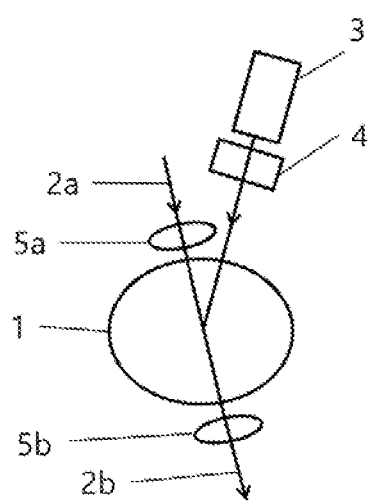

PROPORTION ADJUSTABLE SINGLE-PHOTON BEAM SPLITTER BASED ON COLD ATOM STORAGE

CROSS REFERENCE TO THE RELATED APPLICATIONS

This application is the national phase entry of International Application No. PCT/CN2020/099079, filed on Jun. 30, 2020, which is based upon and claims priority to Chinese Patent Application No. 202010597307.X, filed on Jun. 28, 2020, the entire contents of which are incorporated herein by reference.

TECHNICAL FIELD

The present invention relates to the optical information technical field, and more particularly, to a proportion adjustable signal-photon beam splitter based on control atom storage.

BACKGROUND

A splitter is an apparatus commonly used in the optical field. Its function is to distribute the input optical signals and output them in the desired direction. There are mainly two kinds of existing beam splitters, including a spatial beam splitter that can split light into two or more channels, such as polarization beam splitting prism (PBS), beam splitting prism (BS), fiber beam splitter, etc.; and a temporal beam splitter that can separate the light in time, which is usually implemented using a scheme based on an electromagnetically induced transparency (EIT). The spatial beam splitter can usually only split strong light, while the temporal beam splitter can not only separate strong light, but also realize single-photon level beam splitting. However, the temporal beam splitter using the scheme based on the electromagnetically induced transparency (EIT) has a narrow bandwidth in the frequency domain, usually below 10 MHz.

SUMMARY

An object of the present invention lies in overcoming the above shortcomings of the prior art. Unlike the EIT scheme, the present invention adopts a Roman scheme and provides a proportion adjustable single-photon beam splitter based on cold atom storage, which has a simple structure, a bandwidth that can go up to 100 MHz, and a splitting proportion that can be adjusted as needed.

To achieve the above purpose, the present invention adopts the following technical solution.

A proportion adjustable single-photon beam splitter based on cold atom storage, includes:

a two-dimensional magneto-optical trap for receiving a first optical signal to be split; and a coupling beam incident to the two-dimensional magneto-optical trap.

Preferably, a storage time of the two-dimensional magneto-optical trap is adjusted by controlling a switching time of the coupling beam, and then a proportion of a photon number of a storage part and a photon number of a leakage part of the first optical signal is adjusted.

Preferably, the switching of the coupling beam is controlled by an acousto-optic modulator.

Preferably, the first optical signal is a single-photon light source.

Preferably, before entering the two-dimensional magneto-optical trap and after leaving the two-dimensional magneto-optical trap, the first optical signal needs to pass through a first convex lens and a second convex lens respectively to perform optical path converging.

Preferably, an alkali metal atomic group is trapped in the two-dimensional magneto-optical trap.

Preferably, the splitting proportion can also be adjusted by controlling an optical depth of the alkali metal atomic group.

Preferably, the alkali metal atomic group is a rubidium atomic group or a cesium atomic group.

The advantages of the present invention are:

a single-photon beam splitter with a simple structure, easy to construct, and a bandwidth much larger than that of the existing temporal beam splitter is provided. The splitting proportion of the new beam splitter can be adjusted as needed in various ways.

BRIEF DESCRIPTION OF THE DRAWINGS

FIG. 1 is a schematic diagram of a single-photon beam splitter.

In the figures, 1: two-dimensional magneto-optical trap; 2a: first optical signal; 2b: second optical signal; 3: coupling beam; 4: acousto-optic modulator; 5a: first convex lens; 5b: second convex lens.

DETAILED DESCRIPTION OF THE EMBODIMENTS

In order to clearly explain the technical solution of the present invention, the beam splitter of the present invention will be described in detail through the specific embodiment in conjunction with the attached drawings below.

Embodiment

As shown in FIG. 1, provided is a schematic structural diagram of the single-photon beam splitter of the present invention, including one two-dimensional magneto-optical trap 1 in which an alkali metal atomic group is trapped. The alkali metal atomic group may be a 85Rb atomic group or a cesium atomic group. The two-dimensional magneto-optical trap 1 is a Raman memory. Quantum memory served as a quantum device in the synchronization of the quantum information could enable the photon pulse to be separated in the time domain, in which the separation time interval and the amplitude can be arbitrarily configured, thus also called as a dynamically controllable temporal beam splitter. Here, the present invention exploits a Raman memory, that is, the two-dimensional magneto-optical trap 1, as a memory beam splitter. The single-photon wave packet may be divided into atomic and photonic parts when the memory efficiency is less than 1.

The first optical signal 2a to be split is a single photon and is incident to the two-dimensional magneto-optical trap 1 with an optical depth of 35 after converged through the first convex lens 5a. The coupling beam 3 is incident at a certain angle with the first optical signal 2a to the two-dimensional magneto-optical trap 1, and the switching of the coupling beam 3 is modulated by the acousto-optic modulator 4. An arbitrary function generator can be used to generate an input radio frequency signal, and the acousto-optic modulator is modulated by adjusting parameters of the input radio frequency signal. The coupling beam 3 has a Rabi frequency of MHz and a beam waist of 2 mm. The coupling beam 3 is adiabatically switched off. After passing a controllable storage time (for example, 200 ns), the first optical signal 2a is divided into two parts by the memory beam splitter M-BS (namely, the two-dimensional magneto-optical trap 1), i.e., a leakage part and a storage part, and the first optical signal 2a has the following states:

$$|\psi\rangle \sim \sqrt{1-\eta_{con}}|L\rangle + \sqrt{\eta}e^{i\theta}|R\rangle \qquad (1)$$

Here, $\eta_{con}$ is the conversion efficiency of the first optical signal 2a in the memory beam splitter M-BS (that is, the two-dimensional magneto-optical trap 1) to the spin wave, and $\eta=\eta_{con}\eta_{stored}$ is the total storage efficiency of the first optical signal 2a in the two-dimensional magneto-optical trap 1, including the efficiency $\eta_{con}$ that the first optical signal 2a is converted into the spin wave and the efficiency $\eta_{stored}$ that the spin wave returns to optical excitation. The right two terms in the equation (1) represent the split states corresponding to the leakage part $|L\rangle$ and the storage part $|R\rangle$ during the quantum memory process, respectively, the coefficients $\sqrt{1-\eta_{con}}$ and $\sqrt{\eta}$ are the amplitudes of these two parts. $\theta=\omega\cdot\Delta t$ is the relative phase between the states with the storage time $\Delta t$, $\omega$ represents the optical frequency of the storage part. The storage part $|R\rangle$ corresponds to the atomic collective excited state, which is a state consisting of a larger amount of massive atoms.

The proportion of the photon number of the leakage part to the photon number of the storage part (that is, the splitting proportion of the single-photon beam splitter) is related to the storage time. The shorter the storage time, the higher the proportion of the photon number of the storage part, and the longer the storage time, the higher the proportion of photon number of the leakage portion. Under the control of the acousto-optic modulator 4, the coupling beam 3 is switched on again, to output the first optical signal 2a to be the second optical signal 2b. At this time, the second optical signal 2b is divided into two parts in time, and the bandwidth can go up to 100 MHz. After the second optical signal 2b comes out from the two-dimensional magneto-optical trap 1, it is converged through the second convex lens 5b. Therefore, we can adjust the splitting proportion (the proportion of the photon number of the leakage part and the photon number of the storage part) by controlling the storage time of the two-dimensional magneto-optical trap 1. The focal lengths of the first convex lens 5a and the second convex lens 5b are both 300 mm. In the present invention, the function of the convex lens is to converge the optical path, enhance the interaction between light and atomic groups, and obtain a higher signal-to-noise ratio.

In addition, as the proportion of the photon number of the leakage part and the photon number of the storage part is closely related to Raman storage efficiency, which is strongly dependent on the optical depth of the atomic group, therefore, we can also control the optical depth of the atomic group to control Raman storage efficiency, thereby adjusting the splitting proportion. The adjustment of the optical depth of the atomic group can be achieved by adjusting the power of the back-pumping light in the two-dimensional magneto-optical trap 1. The back-pumping light is a conventional component of the two-dimensional magneto-optical trap, which will not be repeated here.

The above specific embodiments cannot be used as limitations on the protection scope of the present invention. For those skilled in the art, any alternative improvement or transformation made to the embodiment of the present invention falls within the protection scope of the present invention.

The points that are not detailed in the present invention are all well-known technologies for those skilled in the art.

What is claimed is:

1. A proportion adjustable single-photon beam splitter based on cold atom storage comprising:
   a two-dimensional magneto-optical trap for receiving a first optical signal to be split; and
   a coupling beam incident to the two-dimensional magneto-optical trap; and
   wherein an alkali metal atomic group is trapped in the two-dimensional magneto-optical trap; and
   wherein a splitting proportion is adjusted by controlling an optical depth of the alkali metal atomic group.

2. The proportion adjustable single-photon beam splitter according to claim 1, wherein: a storage time of the two-dimensional magneto-optical trap is adjusted by controlling a switching time of the coupling beam, and then a proportion of a photon number of a storage part and a photon number of a leakage part of the first optical signal is adjusted according to the storage time of the two-dimensional magneto-optical trap.

3. The proportion adjustable single-photon beam splitter according to claim 1, wherein: switching of the coupling beam is controlled by an acousto-optic modulator.

4. The proportion adjustable single-photon beam splitter according to claim 1, wherein: the first optical signal is a single-photon light source.

5. The proportion adjustable single-photon beam splitter according to claim 1, wherein: before entering the two-dimensional magneto-optical trap, the first optical signal passes through a first convex lens to perform optical path converging, and after leaving the two-dimensional magneto-optical trap, the first optical signal passes through a second convex lens to perform optical path converging.

6. The proportion adjustable single-photon beam splitter according to claim 1, wherein: the alkali metal atomic group is a rubidium atomic group or a cesium atomic group.

7. The proportion adjustable single-photon beam splitter according to claim 2, wherein: switching of the coupling beam is controlled by an acousto-optic modulator.

8. The proportion adjustable single-photon beam splitter according to claim 2, wherein: the first optical signal is a single-photon light source.

9. The proportion adjustable single-photon beam splitter according to claim 3, wherein: the first optical signal is a single-photon light source.

10. The proportion adjustable single-photon beam splitter according to claim 2, wherein: before entering the two-dimensional magneto-optical trap and after leaving the two-dimensional magneto-optical trap, the first optical signal needs to pass through a first convex lens and a second convex lens respectively to perform optical path converging.

11. The proportion adjustable single-photon beam splitter according to claim 3, wherein: before entering the two-dimensional magneto-optical trap and after leaving the two-dimensional magneto-optical trap, the first optical signal needs to pass through a first convex lens and a second convex lens respectively to perform optical path converging.

12. The proportion adjustable single-photon beam splitter according to claim 4, wherein: before entering the two-dimensional magneto-optical trap and after leaving the two-dimensional magneto-optical trap, the first optical signal needs to pass through a first convex lens and a second convex lens respectively to perform optical path converging.

13. The proportion adjustable single-photon beam splitter according to claim 1, wherein: the alkali metal atomic group is a rubidium atomic group or a cesium atomic group.

* * * * *